(12) United States Patent
Butler (10) Patent No.: US 8,744,921 B2
(45) Date of Patent: Jun. 3, 2014

(54) EXCHANGING VALUE BETWEEN A SERVICE BUYER AND A SERVICE PROVIDER

(71) Applicant: Sears Brands, L.L.C., Hoffman Estates, IL (US)

(72) Inventor: Rhett Butler, Buffalo Grove, IL (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 0 days.

(21) Appl. No.: 13/889,023

(22) Filed: May 7, 2013

(65) Prior Publication Data

US 2013/0346295 A1    Dec. 26, 2013

Related U.S. Application Data

(63) Continuation of application No. 12/268,103, filed on Nov. 10, 2008, now Pat. No. 8,438,070.

(51) Int. Cl.
*G06Q 30/00* (2012.01)
*G06Q 40/00* (2012.01)

(52) U.S. Cl.
USPC ............. 705/26.1; 705/26.35; 705/26.41; 705/35; 705/39; 705/26.4

(58) Field of Classification Search
None
See application file for complete search history.

(56) References Cited

U.S. PATENT DOCUMENTS

| | | | |
|---|---|---|---|
| 5,862,223 A * | 1/1999 | Walker et al. | 705/50 |
| 2002/0002538 A1 * | 1/2002 | Ling | 705/41 |
| 2005/0075975 A1 * | 4/2005 | Rosner et al. | 705/40 |
| 2008/0046362 A1 * | 2/2008 | Easterly | 705/40 |

OTHER PUBLICATIONS

"How to Close Escrow", available at http://www.realestatelibrary.com/escrow.html.*

* cited by examiner

*Primary Examiner* — Ryan Zeender
*Assistant Examiner* — Allen Chein
(74) *Attorney, Agent, or Firm* — McAndrews, Held & Malloy, Ltd.

(57) ABSTRACT

Described herein is technology for, among other things, exchanging value between a service buyer and a service provider. The technology involves establishing a virtual funds account associated with the service buyer. A request for services is received from the service buyer, which includes an amount that the service buyer is willing to pay for the services. An indication that the service provider will perform the services for the service buyer is received, and a hold is placed in the buyer's virtual funds account on an amount of virtual funds corresponding to the amount that the service buyer is willing to pay for the services.

21 Claims, 10 Drawing Sheets

EXCHANGING VALUE BETWEEN A SERVICE BUYER AND A SERVICE PROVIDER

CROSS-REFERENCE TO RELATED APPLICATIONS

The present application is a continuation of U.S. patent application Ser. No. 12/268,103, filed Nov. 10, 2008, now U.S. Pat. No. 8,438,070 issued May 7, 2013, which is hereby incorporated herein by reference, in its entirety.

BACKGROUND

Recently, online service marketplaces have become increasingly more common. Typically, these web sites serve as bulletin board systems to facilitate initial contacts between service buyers and service providers. In most cases, the online marketplaces' involvement ends here. In other words, most online service marketplaces play little, if any, role in monitoring the progress of the provision of the services or in facilitating payment from the buyer to the service provider.

For example, in the most basic case where the online service marketplace merely serves to facilitate the first contact between the buyer and the service provider, the buyer and the service provider are left to arrange the payment mechanics on their own. In the case where the buyer pays some or all of the cost up-front, the buyer runs the risk that an unscrupulous service provider may simply "take the money and run." On the other hand, if the buyer and service provide arrange for payment to be made after the services are rendered, the service provider has no real assurance 1) that the buyer has sufficient funds to pay for the services and 2) that the buyer will in fact pay for services if the services are performed satisfactorily.

Those online service marketplaces that do facilitate payment between the buyer and the service provider still do not provide adequate safeguards to protect the interests of both the buyer and the service provider. In particular, these online service marketplaces, while perhaps providing a convenient means for transferring payment from the buyer to the service provider, still do not provide the service provider with assurance that the buyer can pay for the services and will pay for them once they are performed satisfactorily, while at the same time providing the buyer with adequate protection against "no-shows" and against shoddy work.

SUMMARY

This summary is provided to introduce a selection of concepts in a simplified form that are further described below in the Detailed. Description. This summary is not intended to identify key features or essential features of the claimed subject matter, nor is it intended to be used to limit the scope of the claimed subject matter.

Described herein is technology for, among other things, exchanging value between a service buyer and a service provider. The technology involves establishing a virtual funds account associated with the service buyer. A request for services is received from the service buyer, which includes an amount that the service buyer is willing to pay for the services. An indication that the service provider will perform the services for the service buyer is received, and a hold is placed in the buyer's virtual funds account on an amount of virtual funds corresponding to the amount that the service buyer is willing to pay for the services.

Thus, the service provider is guaranteed that the service buyer can pay for the services and will have the funds to pay for them provided they are performed satisfactorily, but the service buyer is also given the assurance that the service provider will not be paid with the buyer's funds until the service provider has completed the services.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Figure 1:
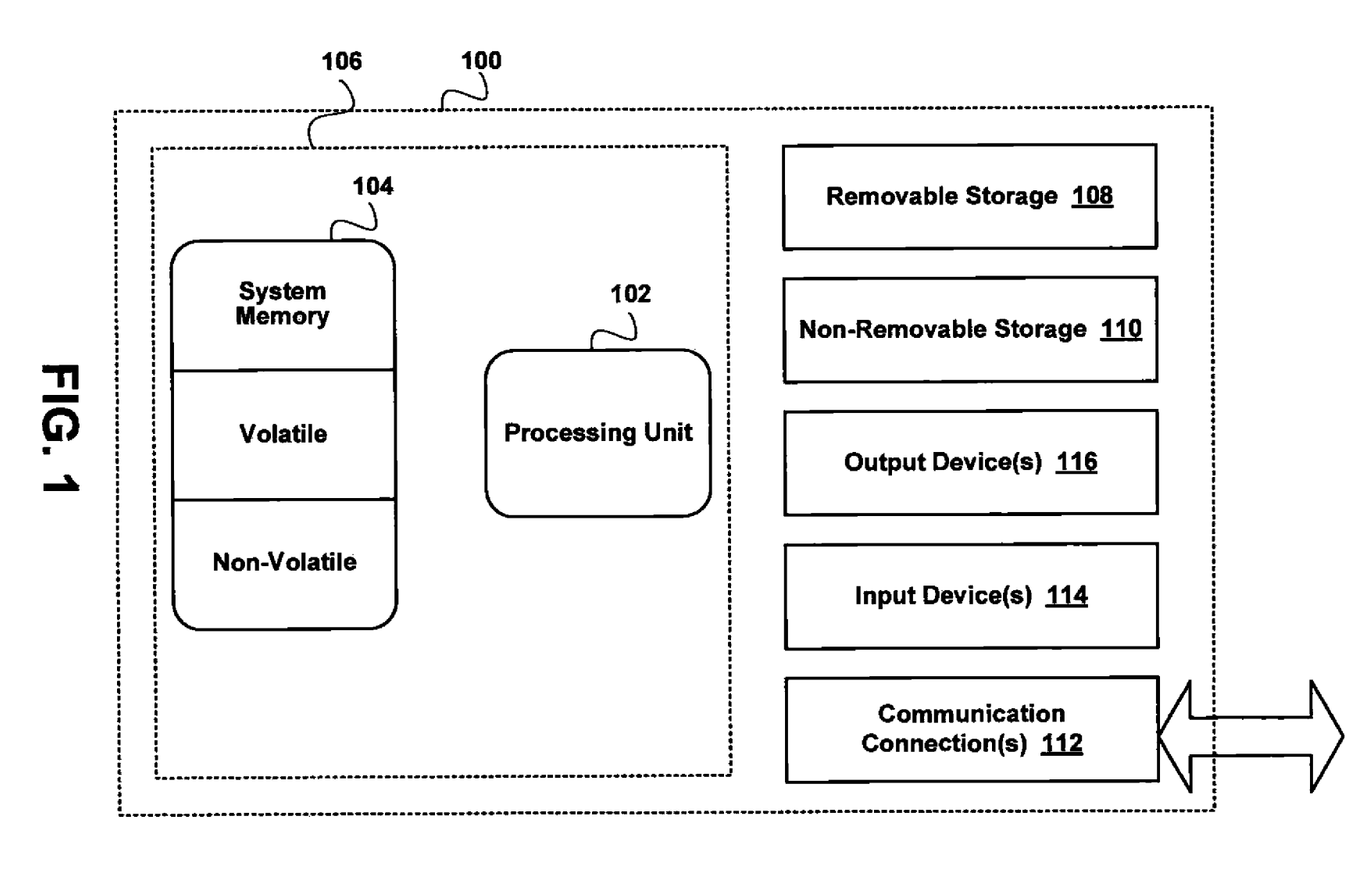
FIG. 1 illustrates an exemplary operating environment for implementing embodiments.

With reference to FIG. 1, an exemplary system for implementing embodiments includes a general purpose computing system environment, such as computing system environment 100. In its most basic configuration, computing system environment 100 typically includes at least one processing unit 102 and memory 104. Depending on the exact configuration and type of computing system environment, memory 104 may be volatile (such as RAM), non-volatile (such as ROM, flash memory, etc.) or some combination of the two. This most basic configuration is illustrated in FIG. 1 by dashed line 106. Additionally, computing system environment 100 may also have additional features/functionality. For example, computing system environment 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 100. Any such computer storage media may be part of computing system environment 100.

Computing system environment 100 may also contain communications connection(s) 112 that allow it to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. Computing system environment 100 may also have input device(s) 114 such as a keyboard, mouse, pen, voice input device, touch input device, etc. Output device(s) 116 such as a display, speakers, printer, etc. may also be included. All these devices are well known in the art and need not be discussed at length here.

Figure 2:
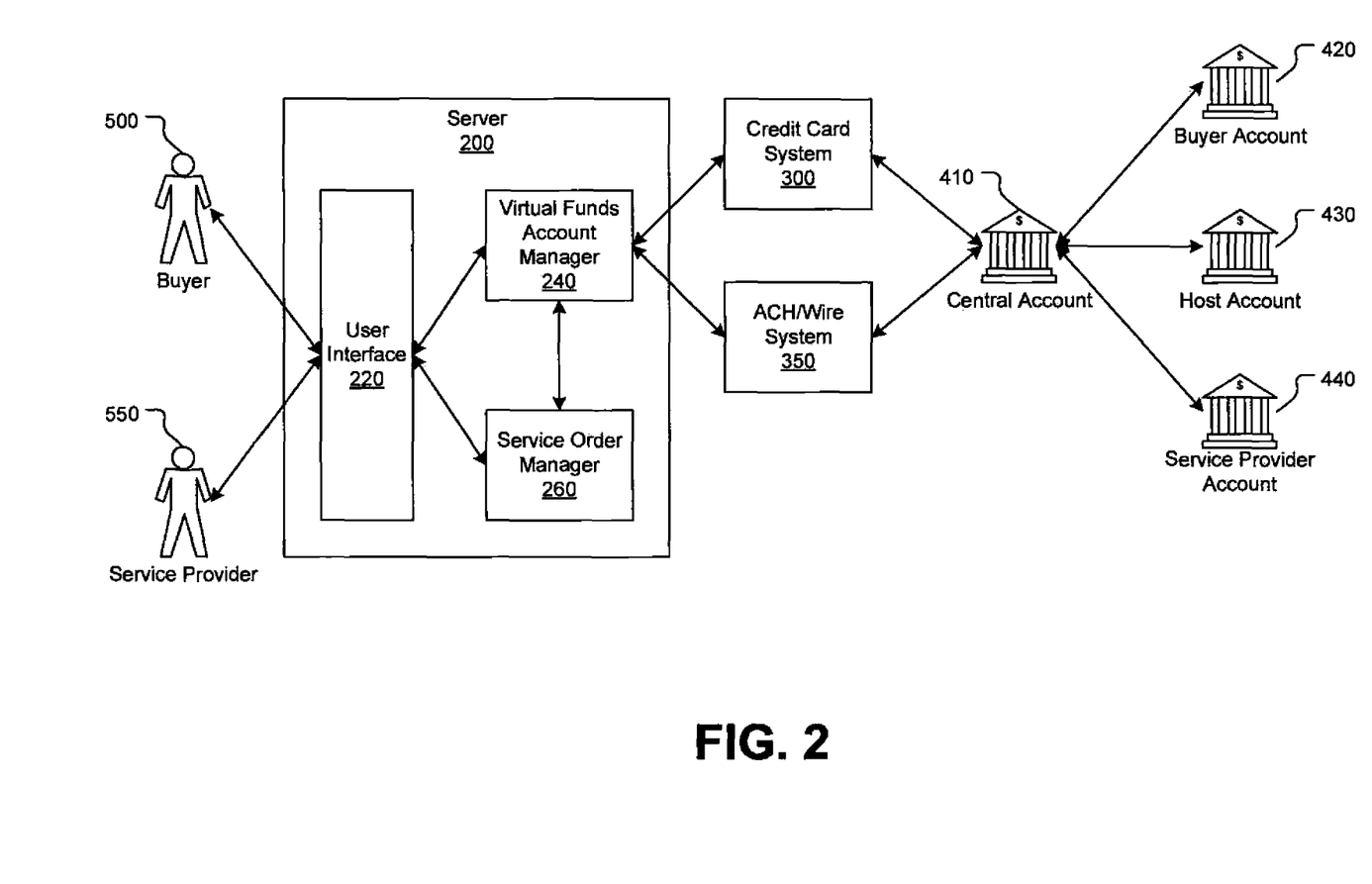
FIG. 2 is a block diagram of a system for exchanging value between a service buyer and a service provider, in accordance with various embodiments of the present invention.

FIG. 2 illustrates a services marketplace system, in accordance with various embodiments of the present invention. The illustrated system is well-suited for operation on the Internet. However, the system may also be implemented on various other communication networks and/or mediums.

Generally speaking, the system of FIG. 2 is operable to facilitate the routing of service requests from service buyers 500 to service providers 550, and more, particularly, to facilitate the exchange of payment between the buyer 500 and service provider 550 in a convenient manner and with adequate safeguards for both parties. The exchange of monies between the buyer 500, the service provider 550, and the intermediate company may be controlled by one or more predetermined business rules. The buyer/service requester 500 may be a consumer. The buyer/service requester 500 may also be an enterprise buyer, such as a home-improvement store or other department store, which routinely orders services on behalf of one or more consumers. The service provider 550 may be a service provider company having a team of multiple technicians, or the service provider 550 may be a sole proprietor. The requests for services can involve a wide range of primary service verticals, including but not limited to home electronics, HVAC, and garage and shed.

The buyer and the service provider each establish virtual funds accounts with the system, to and from which they may make deposits and withdrawals. The balance in a given virtual funds account corresponds to an amount of the virtual account owner's real funds being held by the host (i.e., the owner/operator of server 200) in a central account 410. Based on the type and scope of the requested services, a service order specifying a price is routed to an appropriate service provider. While the buyer's service order is pending, a hold is placed on the buyer's virtual funds in an amount corresponding to the service order price. Thus, in one embodiment, the buyer is not required to pay the service provider anything until the services have been completed, yet the service provider 550 is also reassured that the buyer can and will pay the service provider when the services are satisfactorily completed.

The illustrated system includes a server 200, which is operable to manage communications between various service providers 550 and various service buyers 500, as well as facilitate any payments there between. It should be appreciated that, although depicted as a single unit, server 200 may also represent several separate servers working together in a distributed computing environment.

As shown, server 200 includes a user interface 220, a service order manager 260, and a virtual funds account manager (VFAM) 240, which are communicatively coupled with each other. The user interface 220 is operable to facilitate the server's communications with buyers 500 and service providers 550, and may involve one or more web-based user interface technologies known in the art, such as HTML, JAVA, JavaScript, and Flash, but is not limited as such. The service order manager 260 is operable to create, organize, manage, and track service orders. The VFAM 240 is generally operable to manage various virtual funds accounts, some of which are associated with the buyers 500 and the service providers 550. In so doing, the VFAM 240 is at times in communication with various credit card systems 300 and automated clearing house (ACH)/wire systems 350. The ACH/wire system 350 is capable of effecting deposits to, withdrawals from, and transfers between the host's central account 410, the host's operating account 430, the buyers' accounts 420, and the service providers' accounts 440. The credit card systems 300 are also able to effect deposits into these accounts from credit card accounts. It should be appreciated that central account 410, buyer account 420, host account 430, and service provider account 440 may each be separate accounts at respective depository institutions and are not necessarily components of various embodiments of the present invention.

The following discussion sets forth in detail the operation of present technology for an electronic services marketplace and, in particular, for exchanging value between a service buyer 500 and a service provider 550. With reference to FIGS. 3-9, the illustrated diagrams each illustrate example steps used by various embodiments of the present technology for exchanging value between a service buyer 500 and a service provider 550. Such diagrams include processes that, in various embodiments, are carried out by a processor under the control of computer-readable and computer-executable instructions. The computer-readable and computer-executable instructions may reside, for example, in data storage features such as storage devices 108, 110 of FIG. 1. Although specific operations are disclosed in FIGS. 3-9, such operations are examples. That is, embodiments are well suited to performing various other operations or variations of the operations illustrated in FIGS. 3-9. It is appreciated that the operations in FIGS. 3-9 may be performed in an order different than presented, and that not all of the operations in FIGS. 3-9 may be performed. Moreover, although specific dollar or virtual funds amounts may be disclosed in FIGS. 3-9, such amounts are used herein solely for the purpose of illustration, and embodiments are well-suited to using other amounts.

Figure 3:
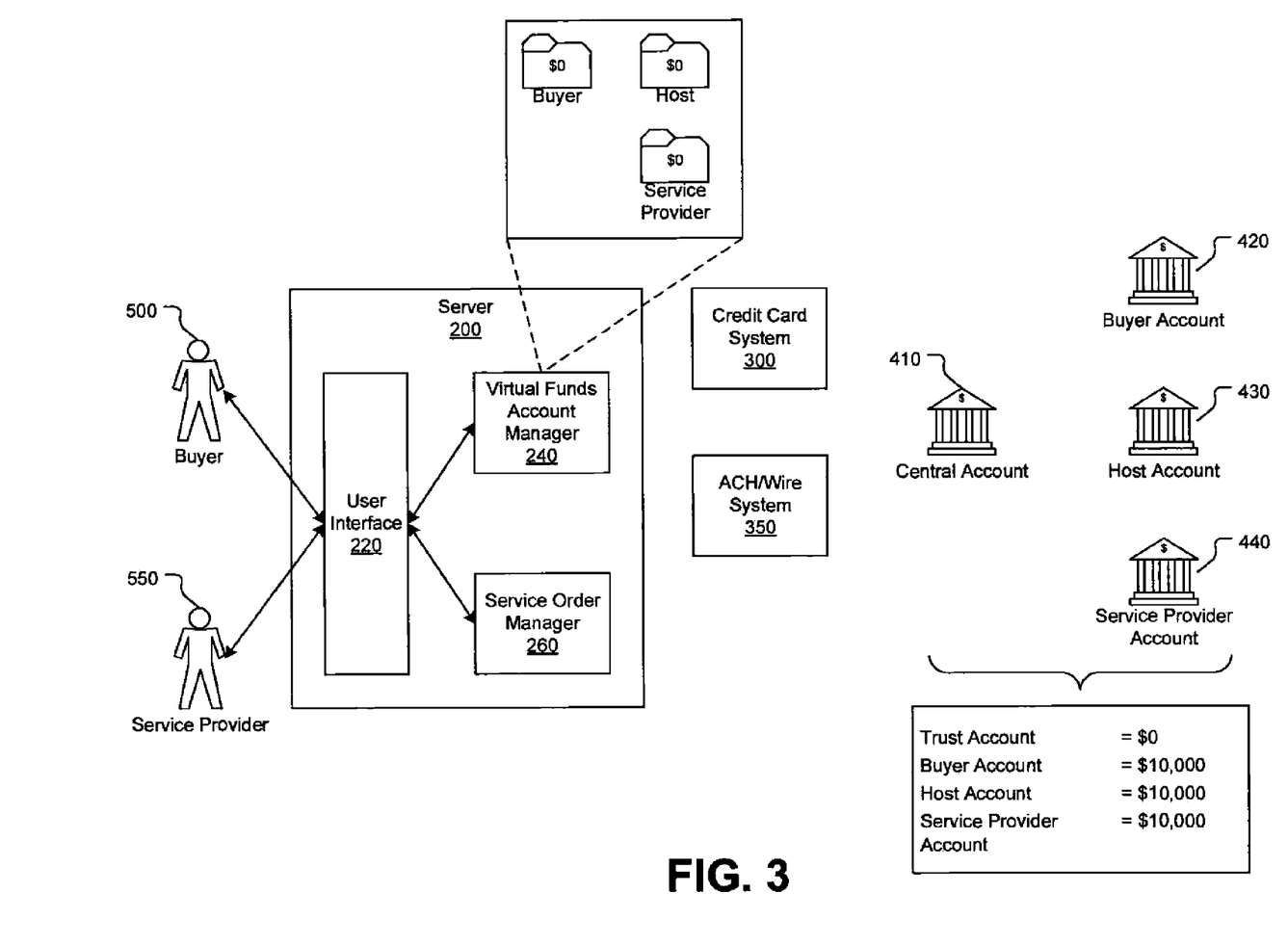
FIG. 3 is a block diagram of establishing accounts with an electronic services marketplace, in accordance with various embodiments of the present invention.

When a buyer 500 wishes to utilize the illustrated system to procure services, or when a service provider 550 wishes to utilize the illustrated system to receive service orders, each must first establish an account with the system. As shown in FIG. 3, the buyer 500 and service provider 550 may submit requests for accounts via the user interface 220. The requests are then relayed to the VFAM 240 and the service order manager 260. The service order manager 260 creates profiles for the buyer 500 and the service provider 550, through which the buyer's and service provider's respective service orders are managed. The VFAM 240 establishes virtual funds accounts for the buyer 500 and the service provider 550. Initially, the virtual funds accounts have balances of zero. As shown, the VFAM 240 may also maintain a virtual funds account corresponding to the host. For the purposes of illustration, it is assumed that the central account 410 initially has a balance of zero and the buyer 500, service provider 550, and host all initially have $10,000 in their respective real accounts (420, 440, 430).

Figure 4:
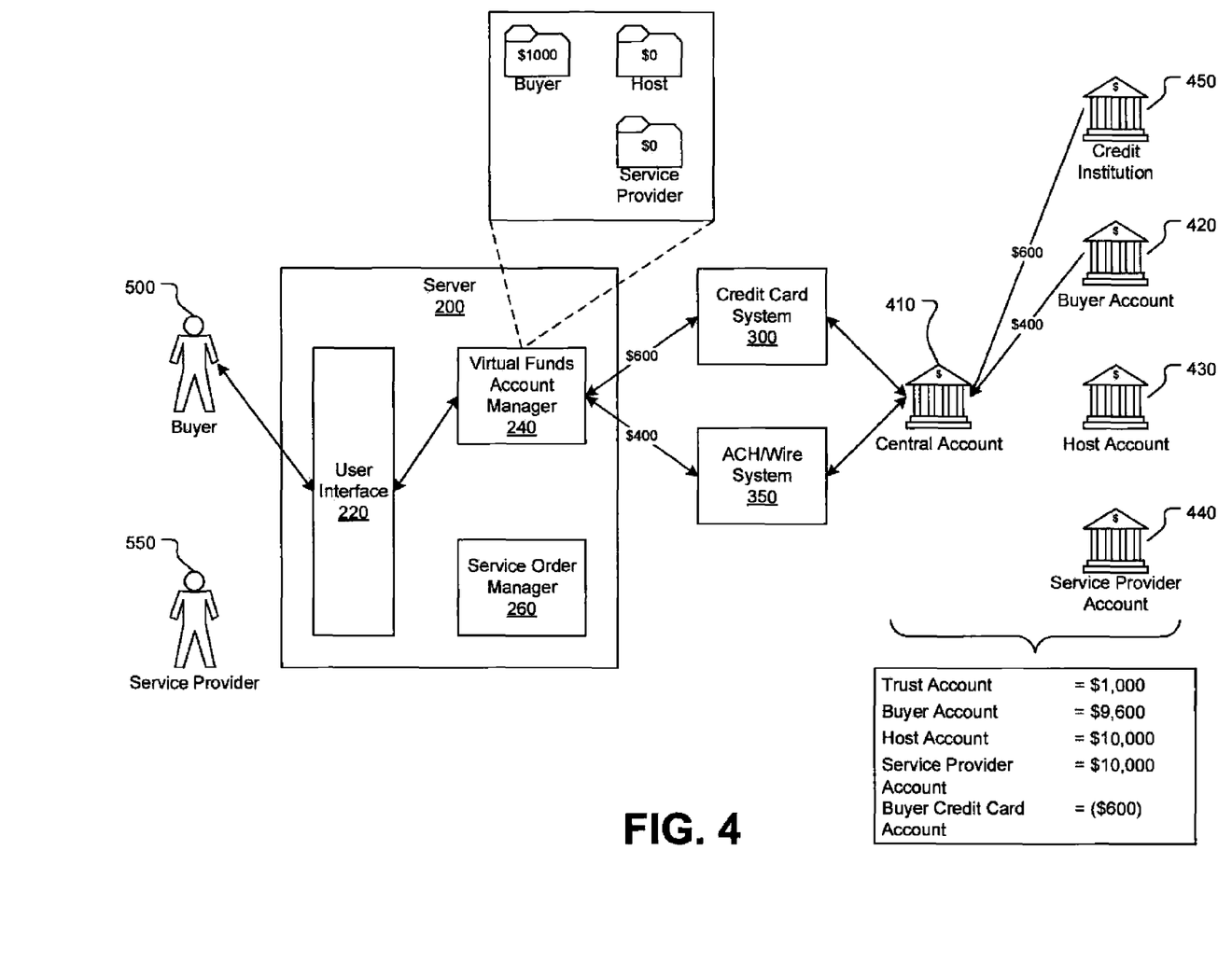
FIG. 4 is a block diagram for depositing funds into a virtual funds account, in accordance with various embodiments of the present invention.

In one embodiment, before a buyer 500 may post a service order, the buyer 500 must fund the buyer's virtual account with virtual funds. As shown in FIG. 4, the buyer 500 may accomplish this by submitting a funding request via the user interface 220, which forwards the request to the VFAM 240. In the illustrated example, the buyer 500 has requested to purchase $1000 in virtual funds, of which the buyer 500 has designated that $400 should be paid for using the buyer's bank account 420 and $600 should be paid for using the buyer's credit card. Accordingly, the VFAM 240 requests the credit card system 300 to initiate a $600 payment from the buyer's credit institution 450, eventually funding into the central account 410, and the VFAM 240 requests the ACH/wire system 350 to initiate an ACH or wire transfer of $400 from the buyer's account 420 to the central account 410. Once the transfers are complete, the central account shows a balance of $1000, and the VFAM 240 updates the buyer's virtual funds account to reflect a funding of $1000.

In the above example, it should be appreciated that one or more intermediary accounts may be involved in the described transfers. For example the $600 transfer initiated by the credit card system 300 may not clear directly from the credit institution 450 to the central account 410, but rather these funds may first clear through an intermediate settlement account or the like.

Figure 5:
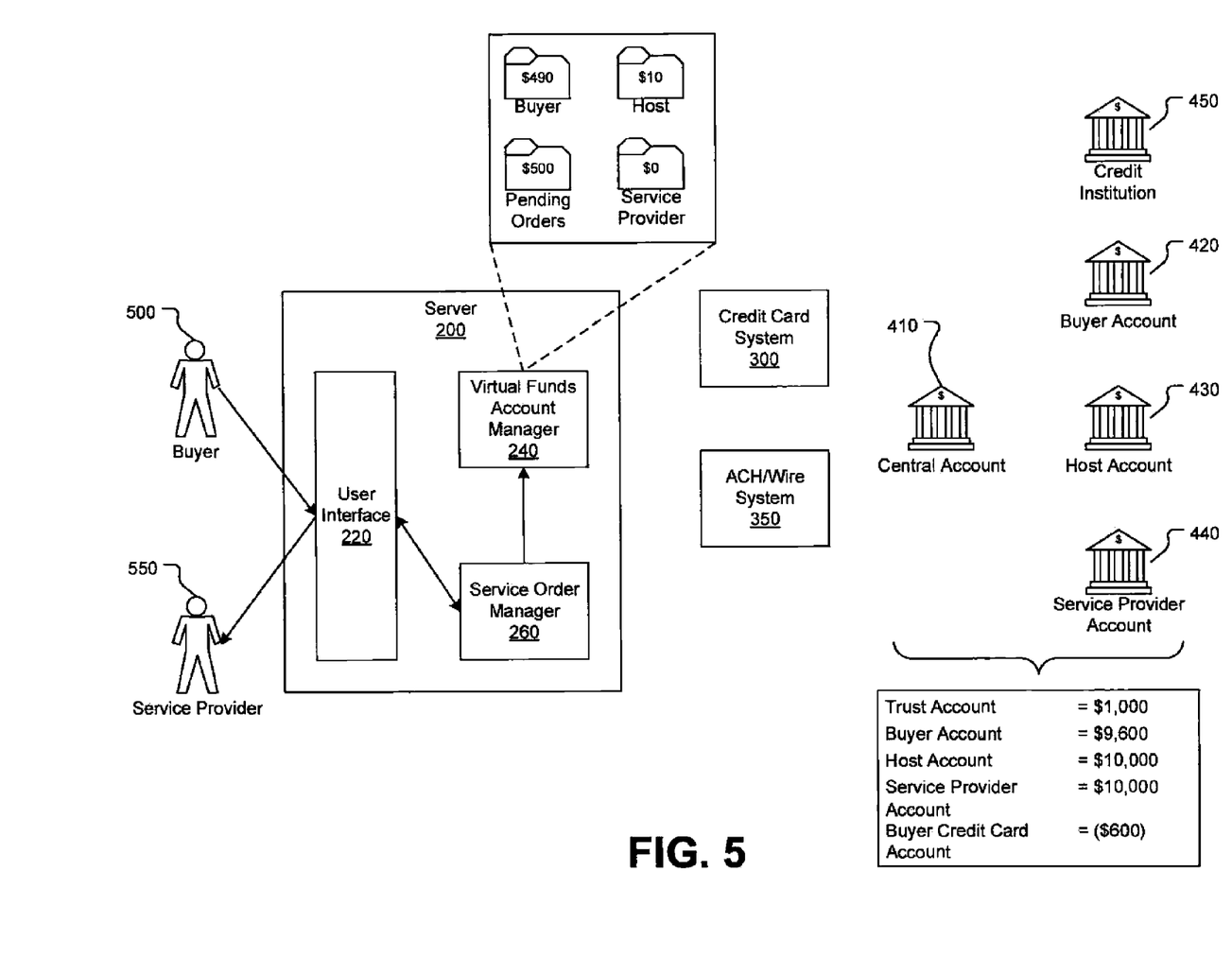
FIG. 5 is a block diagram of submitting a request for services and creating a service order, in accordance with various embodiments of the present invention.

Once the buyer's virtual funds account has been funded, the buyer may then begin submitting service orders to service providers 550. As shown in FIG. 5, the buyer 500 submits a request for services, including an amount the buyer 500 is willing to pay for the requested services (e.g., $500), to the server 200 via the user interface. The user interface 220 in turn relays the service request to the service order manager 260. The service order manager 260 then generates a service order based on the information submitted by the buyer 500 and notifies the VFAM 240 of the service order. If the buyer's virtual funds account is not sufficiently funded to cover the service order, the VFAM 240 will notify the service order manager 260, which will require the buyer to further fund the buyer's virtual funds account before posting the service order. Once the service order manager 260 receives confirmation from the VFAM 240 that there are sufficient virtual funds in the buyer's virtual funds account to cover the service order, the service order manager 260 will post the service order and provide it to the service provider 550, for example, via the user interface 220. The determination as to which particular service provider shall be sent the service order may be determined based upon one or more selections made by the buyer 500. Alternatively, the service order may be provided to multiple service providers, who in turn respond with their ability to perform the requested services. In one embodiment, the service providers may respond to the service order with an acceptance, rejection, or counter-offer. The counter-offer may alter one or more components of the service order, including but not limited price, scope, time and, date.

Upon receiving notification of the service order, the VFAM 240 places a hold on the buyer's virtual funds account in an amount corresponding to the amount the buyer 500 is willing to pay for the services. Assuming a dollar-for-dollar correlation between the amount of real funds the buyer 500 has in the central account 410 and the buyer's virtual funds account, the VFAM 240 then places a hold in the amount specified by the buyer in the service order. It should be appreciated that the mechanism by which the VFAM 240 effects the hold on the buyer's funds may be achieved in a number of ways. In one embodiment, this is achieved by noting in the buyer's virtual funds account that a certain amount is subject to a hold. In the illustrates embodiment, the VFAM 240 places the buyer's virtual funds on hold by transferring the $500 of the buyer's funds subject to the hold into a virtual pending orders account. If, subsequent to the creation of the service order, a service provider 550 responds to the service order with a counter-offer that changes the service price, and the buyer 500 subsequently accepts the counter-offer, the VFAM 240 may adjust the hold on the buyer's virtual funds to reflect the new price.

In various embodiments, the system may also collect a posting fee from the buyer's virtual funds account when the buyer posts a service order to the system. This may be achieved in a number of ways. In one embodiment, the system may debit the buyer's virtual funds account in the amount of the posting fee (e.g., $10) and then transfer a corresponding amount from the central account 410 to the host's account 430. In the illustrated embodiment, the VFAM 240 maintains a record of a virtual funds account associated with the host and collects fees by transferring the fee from the fee payor's virtual funds account to the host virtual funds account. In this embodiment, the system need not initiate an ACH or wire transfer each time it collects a posting fee. Instead, the posting fees can be transferred from the buyers' virtual funds accounts to the host virtual funds account. Then, the system need only transfer actual funds from the central account 410 to the host's account 430 periodically, such as daily, weekly, etc.

Figure 6:
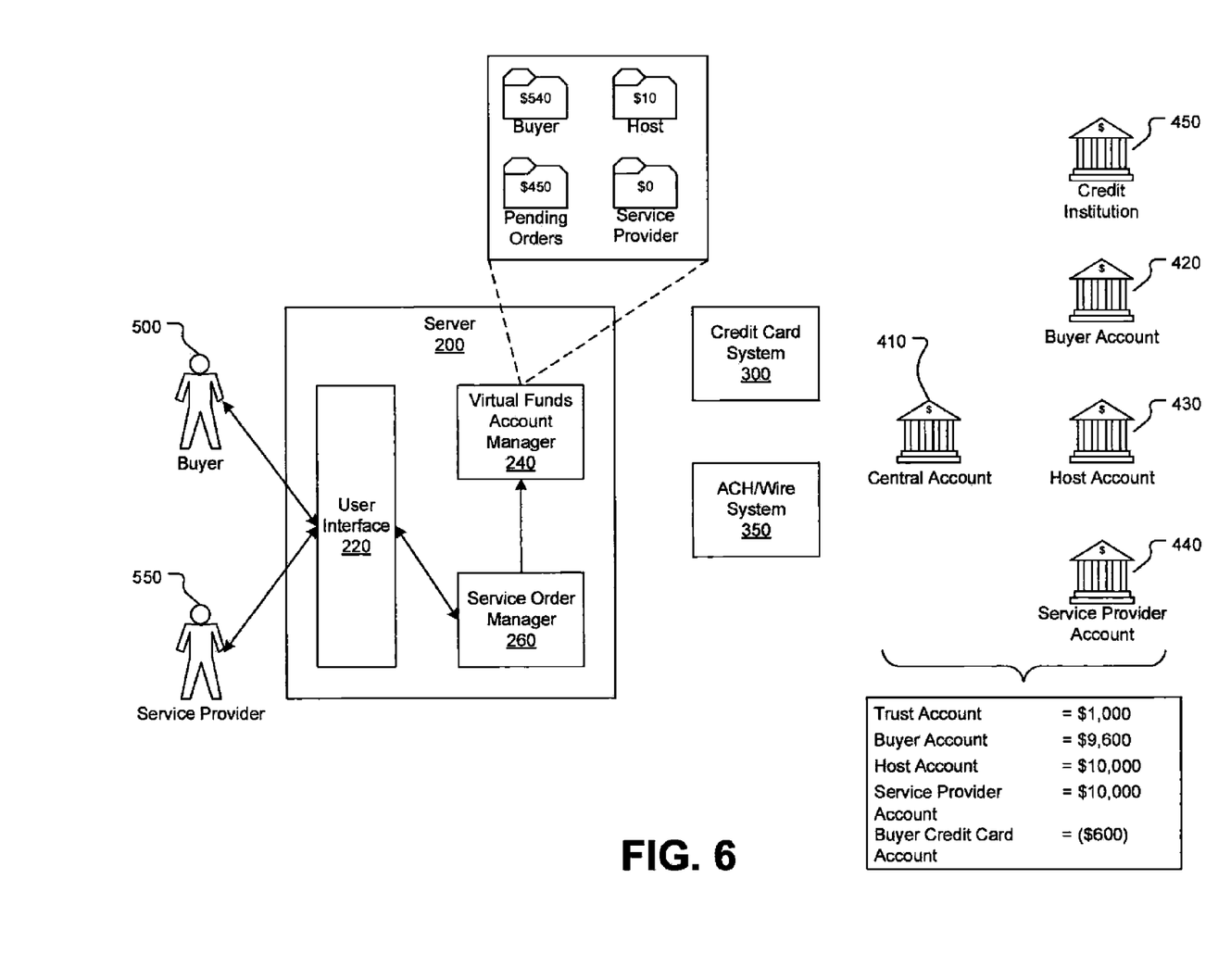
FIG. 6 is a block diagram of a buyer and a service provider agreeing to adjust the price of a service order, in accordance with various embodiments of the present invention.

Ultimately, a service provider 550 may agree to provide the requested services for the buyer. At any time after the service provider 550 has accepted the service order, the buyer 500 and the service provider 550 may mutually agree to adjust the price of the services. For example, when the buyer 500 created the service order, the buyer 500 may have simply overestimated the costs of the services. Alternatively, the service provider may discover that additional work is required beyond the original scope of the service order (e.g, a service order for installation of an under-counter microwave failed to mention that a new electrical outlet would need to be installed. In any such case, the buyer 500 or the service provider 550, with the approval of the other, may notify the service order manager 260 of the price change. In the example of FIG. 6, the buyer and the service provider 550 have agreed to reduce the price of the requested services from $500 to $450. The service order manager 260 updates the service order to reflect the change and also notifies the VFAM 240 of the change. The VFAM 240 will then update the amount of the buyer's virtual funds subject to the hold to reflect the new agree-upon service price.

Figure 7:
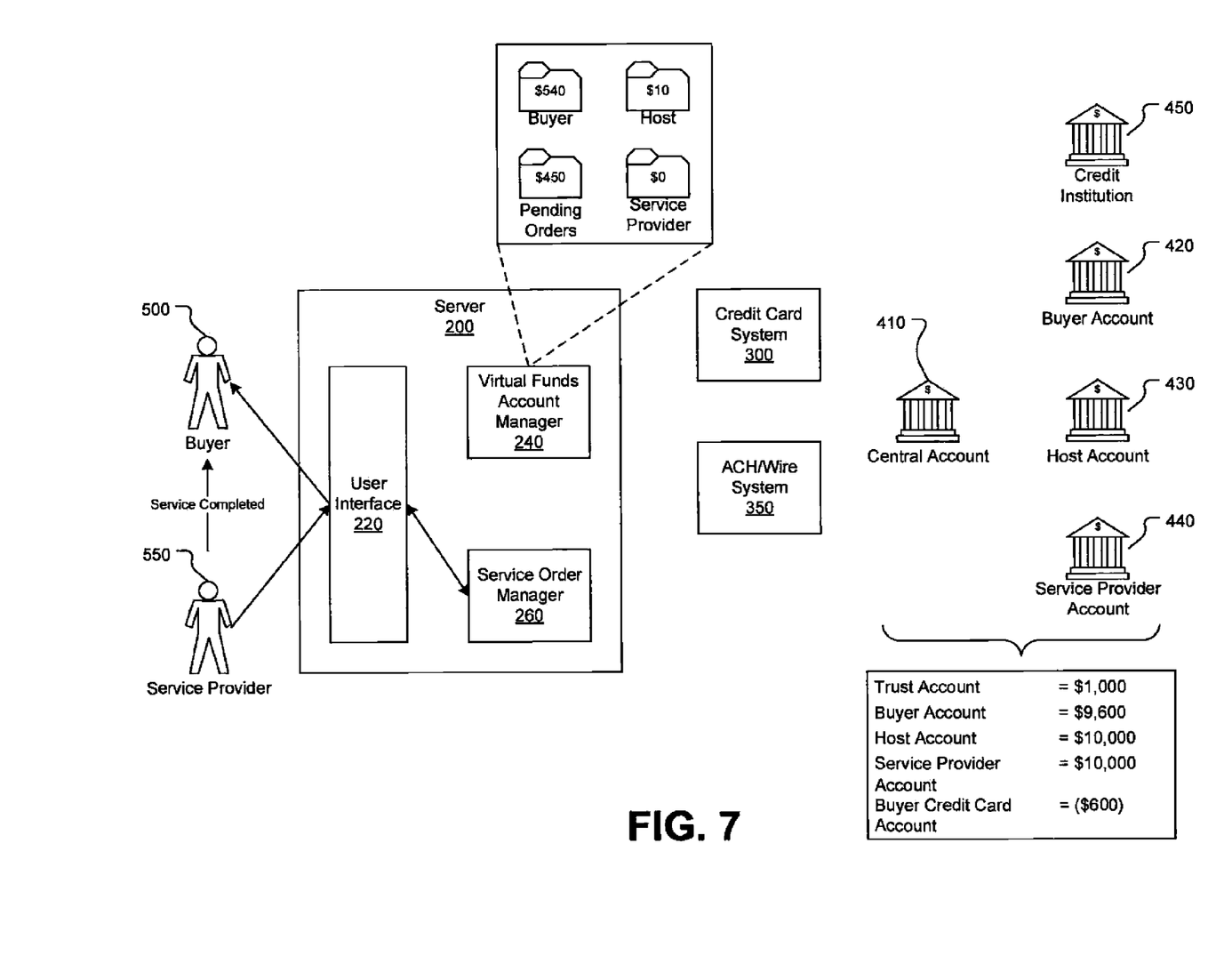
FIG. 7 is a block diagram of notifying a buyer that a service order has been completed, in accordance with various embodiments of the present invention.

When the service provider 550 has completed the requested services, the service provider 550 provides an indication to the server 200 that the services have been completed. As shown in the example of FIG. 7, the service provider 550 may submit this "completion record" via the user interface 220, which in turn relays the completion record to the service order manager 260. When the service order manager 260 receives the completion record, the service order manager notifies the buyer 500—via the user interface 220, for example—that the service provider 550 has indicated the completion of the services and requests the buyer's confirmation of the same.

At this point, the buyer 500 has an opportunity to express dissatisfaction with the service provider's services. If, in the buyer's opinion, the services have not been completed to the buyer's expectations or specifications, the buyer 500 may notate such with the service order manager 260, which in turn conveys the same to the service provider 550, allowing the service provider 550 an opportunity to rectify the situation.

Figure 8:
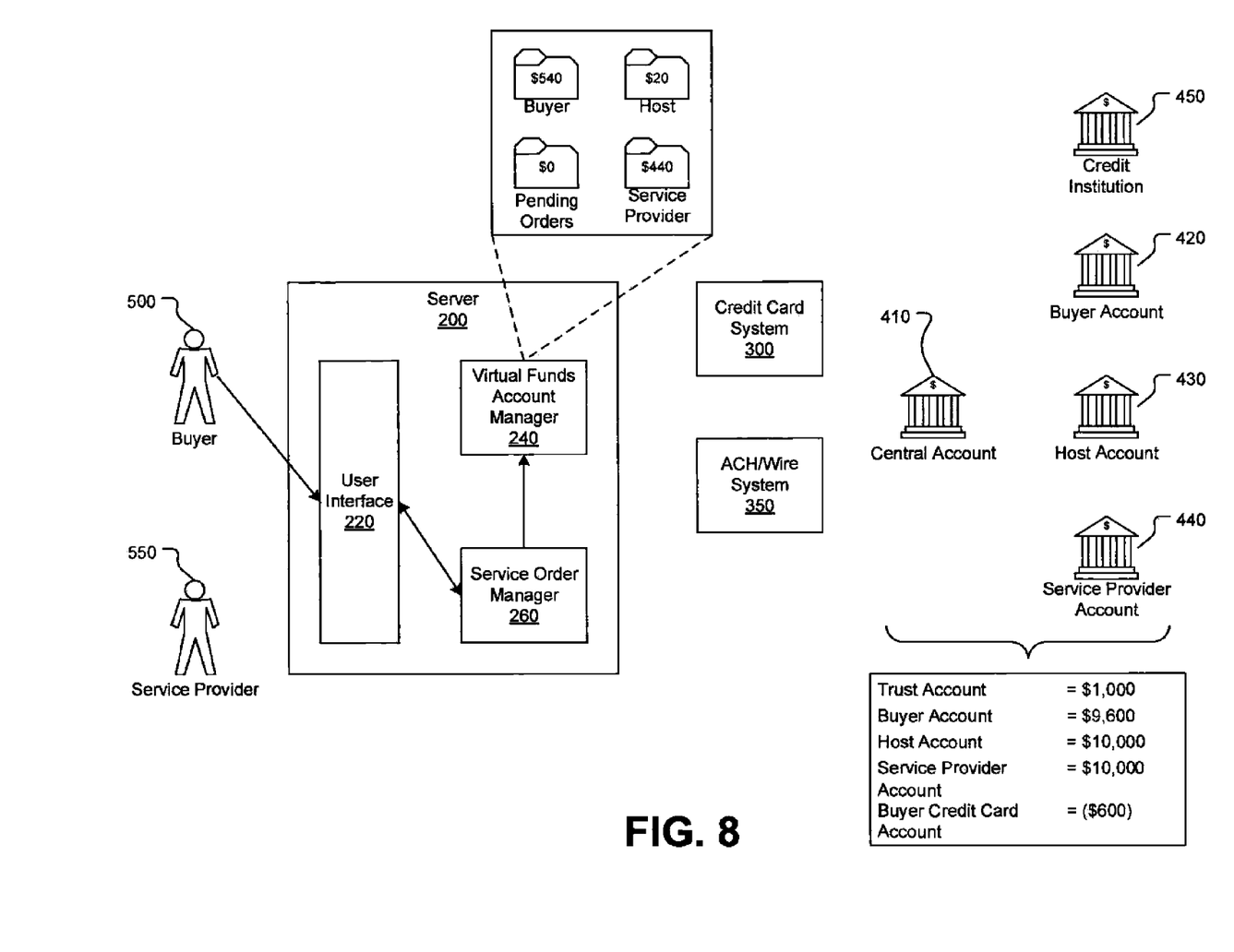
FIG. 8 is a block diagram of receiving confirmation that a service order has been completed and effecting payment therefor, in accordance with various embodiments of the present invention.

When the buyer 500 is ultimately satisfied with the provided services, the buyer 500 confirms the completion of the services with the server 200. As shown in FIG. 8, the buyer may provide the confirmation via the user interface 220, which in turn relays the confirmation to the service order manager 260. Upon receiving the confirmation from the buyer, the service order manager 260 closes out the service order and notifies the VFAM 240 that the service order is complete. The VFAM 240 may also notify the service provider 550 of the buyer's confirmation. Upon receiving the buyer's confirmation, the VFAM 240 effects virtual payment for the services from the buyer 500 to the service provider 550 by releasing the held funds and transferring them to the service provider's virtual funds account. In one embodiment, this may be effected by transferring the amount previously allocated to the virtual pending orders account to the service provider's virtual funds account. At this time, the host may also collect a service fee or commission from the service provider 550. As shown in FIG. 7, the VFAM 240 has transferred a $10 service fee from the virtual pending orders account to the host's virtual funds account and the remaining $440 from the virtual pending orders account to the service provider's virtual funds account. It is noted that while VFAM 240 is effecting these various transfers among the virtual funds accounts, the sum total of the virtual funds accounts continues to reflect the balance of the central account 410 (e.g., $1000).

It is conceivable that the services performed by the service provider 550 actually end up costing less than the amount originally specified in the service order. In such a case, the service provider 550 may close out the service order for the lesser amount. Accordingly, of the buyer's virtual funds that were subject to the hold, an amount corresponding to the lesser service order amount will then be transferred to the service provider's virtual funds account, while the difference is released back to the buyer's virtual funds account.

Scenarios may also arise in which the buyer 500 has submitted a service order and has had a hold placed on the corresponding amount of the buyer's virtual funds (such as is shown in FIG. 5), but then the buyer 500 decides he or she no longer needs the requested services. If a service provider 550 has not already accepted the service order, the buyer 500 may simply submit a cancellation request. Upon processing of the cancellation request, the hold that was previously placed on the buyer's virtual funds is released. Just as before, this may be achieved by transferring the buyer's virtual funds in the virtual pending orders account back to the buyer's virtual funds account. In one embodiment, if a service provider 550 has already accepted the service order, the buyer 500 may again submit a cancellation request, but in this instance, the service provider 550 is notified of the cancellation request. In this embodiment, the hold on the buyer's virtual funds may not be released until the service provider 550 agrees to the cancellation.

Figure 9:
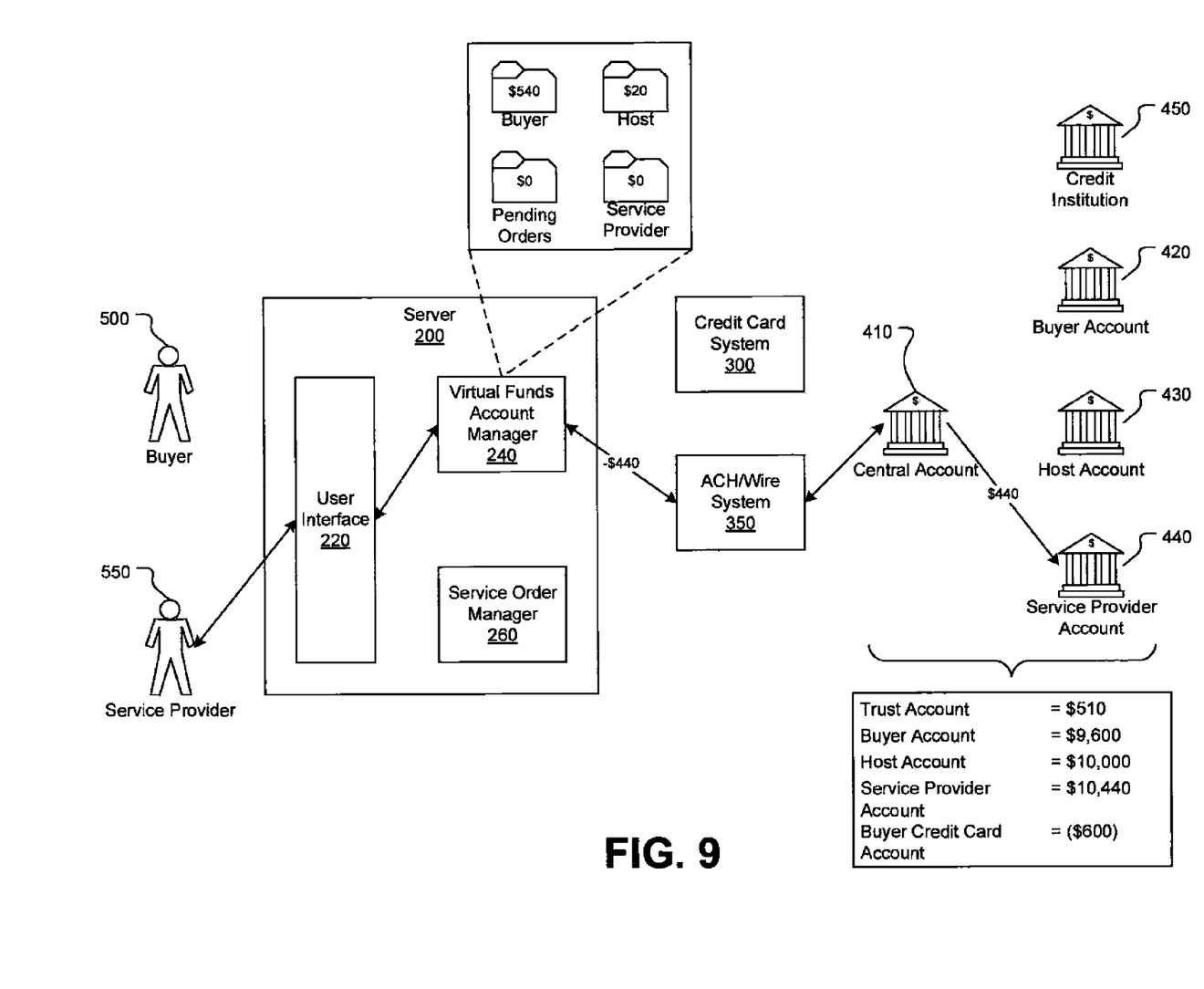
FIG. 9 is a block diagram of dispersing funds from a virtual funds account associated with a service provider to the service provider's bank account, in accordance with various embodiments of the present invention.
Figure 10:
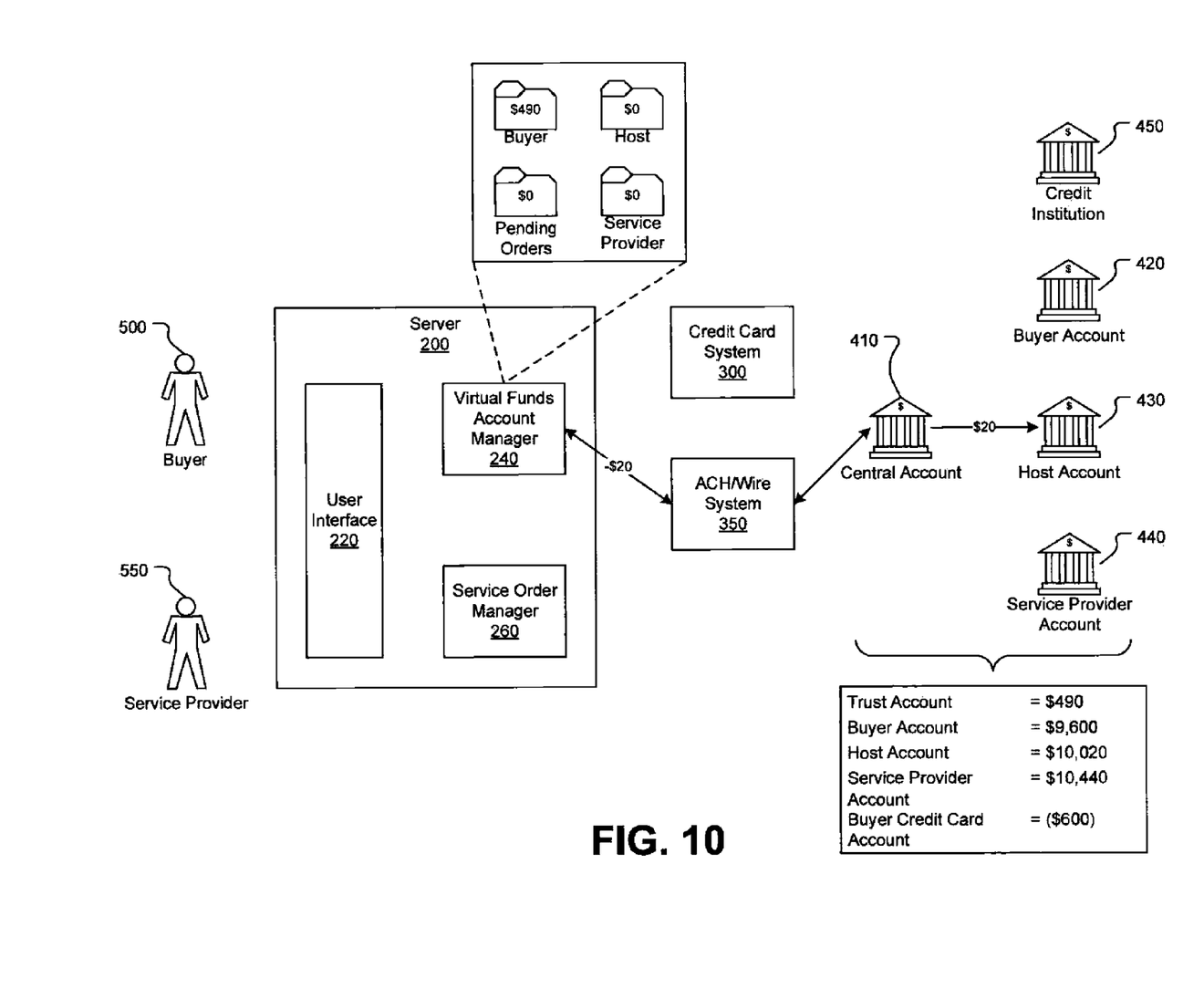
FIG. 10 is a block diagram of dispersing funds from a virtual funds account associated with a host of an electronic services marketplace to the host's bank account, in accordance with various embodiments of the present invention.

The service provider 550 may eventually request a "dispersal" of the service provider's virtual funds to the service provider's bank account 440. As shown in FIG. 9, the service provider 550 may submit a dispersal request to the server 200 via the user interface 220, which then relays the request to the VFAM 240. The VFAM 240 debits the service provider's virtual funds account in the amount of the dispersal request (e.g., $440), and then notifies the ACH/Wire System 350 to effect a corresponding transfer from the central account 410 to the service provider's account 440. After the transfer from the central account 410 to the service provider's account 440 is complete, the virtual funds accounts and the central account 410 are again in balance (e.g., $560), and the service provider's account 440 now has a balance of $10,440.

It should be appreciated that the buyer 500 may similarly request a dispersal of any remaining virtual funds to the buyer's bank account 420. This may be achieved in substantially the same manner as the dispersal was effected for the service provider 550 in FIG. 8, though it is not limited as such.

Finally, as discussed above, the host may make periodic dispersals of the virtual funds it has collected as posting fees, service fees, or the like. As shown in FIG. 9, this may be achieved by the VFAM 240 debiting the host's virtual funds account in the dispersal amount (e.g., $20) and then notifying the ACH/Wire System 350 to effect a corresponding transfer from the central account 410 to the host's account 430. After the transfer from the central account 410 to the host's account 430, the virtual funds accounts and the central account 410 are again in balance (e.g., $540), and the host's account 430 then has a balance of $10,020.

Thus, various embodiments provide for methods and systems for exchanging value between a service buyer and a service provider that include critical safeguards on both sides on the transaction. For example, by requiring buyers to pre-fund a virtual account with enough, funds to cover the cost of requested services, and then placing holds on those funds, as in some embodiments, the service provider is protected against accepting service orders from customers who do not have the funds to pay. Moreover, despite pre-funding the virtual account, the buyer need not fear the "take your money and run" service provider, because the service provider is not paid until the buyer confirms satisfactory completion of requested services.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A non-transitory computer-readable medium having stored thereon instructions executable by at least one processor, the instructions causing the at least one processor to perform actions for exchanging value between a service buyer and at least one service provider, the actions comprising:
    funding a buyer virtual funds account established for the service buyer, using actual funds;
    receiving a request for services from the service buyer, wherein the request for services includes an amount that the service buyer is willing to pay for the services;
    placing a hold on an amount of virtual funds corresponding to the amount that the service buyer is willing to pay for the services, in the buyer virtual funds account;
    adjusting up or down the hold on the amount of virtual funds corresponding to a negotiated amount that the service buyer is willing to pay for the services;
    receiving an indication from the at least one service provider that the at least one service provider will perform the services for the service buyer for a final cost;
    adjusting up or down the hold corresponding to the final cost;
    upon receiving a confirmation from the service buyer that the at least one service provider has performed the requested services, releasing the hold in order to transfer the held virtual funds from the buyer virtual funds account to a virtual funds account established for the at least one service provider; and
    transferring an amount of actual funds corresponding to at least a portion of the final cost to an actual funds account associated with the at least one service provider.

2. The non-transitory computer-readable medium according to claim 1, wherein the received request for services is provided to the at least one service provider only if the virtual funds account of the service buyer has at least the amount that the service buyer is willing to pay for the services.

3. The non-transitory computer-readable medium according to claim 1, wherein the at least one service provider comprises a plurality of service providers.

4. The non-transitory computer-readable medium according to claim 1, wherein placing the hold transfers the amount that the service buyer is willing to pay from the virtual funds account of the service buyer to a virtual pending orders account.

5. The non-transitory computer-readable medium according to claim 1, wherein the actions comprise:
    receiving an indication from the at least one service provider that the services requested by the service buyer have been completed; and
    requesting confirmation from the service buyer that the at least one service provider completed the requested services.

6. The non-transitory computer-readable medium according to claim 1, wherein the virtual funds account of the service buyer is debited an amount when the request for services is received.

7. The non-transitory computer-readable medium according to claim 1, wherein the virtual funds account of the at least one service provider is debited an amount upon transferring payment of the amount of actual funds corresponding to the final cost from the service buyer to the at least one service provider.

8. A system for exchanging value between a service buyer and at least one service provider, the system comprising:
    at least one processor for communicating with the service buyer and the at least one service provider, the at least one processor operable to, at least:
        fund a buyer virtual funds account established for the service buyer, using actual funds;
        receive a request for services from the service buyer, wherein the request for services includes an amount that the service buyer is willing to pay for the services;
        place a hold on an amount of virtual funds corresponding to the amount that the service buyer is willing to pay for the services, in the buyer virtual funds account;
        adjust up or down the hold on the amount of virtual funds corresponding to a negotiated amount that the service buyer is willing to pay for the services;
        receive an indication from the at least one service provider that the at least one service provider will perform the services for the service buyer for a final cost;
        adjust up or down the hold corresponding to the final cost;
        upon receiving a confirmation from the service buyer that the at least one service provider has performed the requested services, release the hold in order to transfer the held virtual funds from the buyer virtual funds account to a virtual funds account established for the at least one service provider; and transfer an amount of actual funds corresponding to at least a portion of the final cost to an actual funds account associated with the at least one service provider.

9. The system according to claim 8, wherein the received request for services is provided to the at least one service provider only if the virtual funds account of the service buyer has at least the amount that the service buyer is willing to pay for the services.

10. The system according to claim 8, wherein the at least one service provider comprises a plurality of service providers.

11. The system according to claim 8, wherein placing the hold transfers the amount that the service buyer is willing to pay from the virtual funds account of the service buyer to a virtual pending orders account.

12. The system according to claim 8, wherein the at least one processor is operable to, at least:

receive an indication from the at least one service provider that the services requested by the service buyer have been completed; and request confirmation from the service buyer that the at least one service provider completed the requested services.

13. The system according to claim 8, wherein the virtual funds account of the service buyer is debited an amount when the request for services is received.

14. The system according to claim 8, wherein the virtual funds account of the at least one service provider is debited an amount upon transferring payment of the amount of actual funds corresponding to the final cost from the service buyer to the at least one service provider.

15. A method for exchanging value between a service buyer and at least one service provider, the method comprising:

by at least one processor operable to communicate with the service buyer and the at least one service provider, funding a buyer virtual funds account established for the service buyer, using actual funds;

receiving a request for services from the service buyer, wherein the request for services includes an amount that the service buyer is willing to pay for the services;

placing a hold on an amount of virtual funds corresponding to the amount that the service buyer is willing to pay for the services, in the buyer virtual funds account;

adjusting up or down the hold on the amount of virtual funds corresponding to a negotiated amount that the service buyer is willing to pay for the services;

receiving an indication from the at least one service provider that the at least one service provider will perform the services for the service buyer for a final cost;

adjusting up or down the hold corresponding to the final cost;

upon receiving a confirmation from the service buyer that the at least one service provider has performed the requested services, releasing the hold in order to transfer the held virtual funds from the buyer virtual funds account to a virtual funds account established for the at least one service provider; and transferring an amount of actual funds corresponding to at least a portion of the final cost to an actual funds account associated with the at least one service provider.

16. The method according to claim 15, wherein the received request for services is provided to the at least one service provider only if the virtual funds account of the service buyer has at least the amount that the service buyer is willing to pay for the services.

17. The method according to claim 15, wherein the at least one service provider comprises a plurality of service providers.

18. The method according to claim 15, wherein placing the hold transfers the amount that the service buyer is willing to pay from the virtual funds account of the service buyer to a virtual pending orders account.

19. The method according to claim 15, wherein the method comprises:

receiving an indication from the at least one service provider that the services requested by the service buyer have been completed; and requesting confirmation from the service buyer that the at least one service provider completed the requested services.

20. The method according to claim 15, wherein the virtual funds account of the service buyer is debited an amount when the request for services is received.

21. The method according to claim 15, wherein the virtual funds account of the at least one service provider is debited an amount upon transferring payment of the amount of actual funds corresponding to the final cost from the service buyer to the at least one service provider.

* * * * *